United States Patent [19]

Kraus

[11] Patent Number: 4,728,236
[45] Date of Patent: Mar. 1, 1988

[54] FASTENING DEVICE FOR USE ON THREADED BOLTS OR STUDS

[75] Inventor: Willibald Kraus, Grunstadt, Fed. Rep. of Germany

[73] Assignee: TRW United Carr GmbH, Alsenborn, Fed. Rep. of Germany

[21] Appl. No.: 886,666

[22] Filed: Jul. 16, 1986

[30] Foreign Application Priority Data

Jul. 19, 1985 [DE] Fed. Rep. of Germany ....... 3525865
Jul. 11, 1986 [DE] Fed. Rep. of Germany ....... 3618486

[51] Int. Cl.⁴ ............................................. F16B 37/00
[52] U.S. Cl. ..................................... 411/437; 411/510; 411/525; 24/662
[58] Field of Search ................. 411/437, 56, 182, 433, 411/436, 525, 526, 527, 528, 918, 510, 512; 403/289, 343, 71; 24/662, 108

[56] References Cited

U.S. PATENT DOCUMENTS

| 750,343 | 1/1904 | Brockway | 403/343 X |
| 3,203,302 | 8/1965 | Frederick | 411/437 X |
| 3,362,280 | 1/1968 | Muller | 411/918 X |
| 3,736,834 | 6/1973 | MacDonald | 411/913 X |
| 3,779,495 | 12/1973 | Richards | 411/56 X |
| 4,435,111 | 3/1984 | Mizusawa | 411/437 |
| 4,579,493 | 4/1986 | Schaty | 411/437 X |

FOREIGN PATENT DOCUMENTS

| 1965107 | 7/1971 | Fed. Rep. of Germany | 411/437 |
| 1220181 | 1/1960 | France | 411/56 |
| 1,448,733 | 4/1966 | France | 403/343 |
| 925034 | 5/1963 | United Kingdom | 411/56 |
| 1192694 | 5/1970 | United Kingdom | 411/527 |

Primary Examiner—Gary L. Smith
Assistant Examiner—Rodney M. Lindsey
Attorney, Agent, or Firm—Fay, Sharpe, Beall, Fagan, Minnich & McKee

[57] ABSTRACT

A fastening device for connection to threaded bolts or studs. The device is preferably molded from plastic and has an internal opening provided with one or more resilient catch projections distributed about the circumference of the opening. The projections extend axially and radially into the opening. A series of graduations or thread-form configurations are carried by each projection. When a bolt is received in the opening, the projections are resiliently deflected and the graduations engage the threads of the bolt.

7 Claims, 10 Drawing Figures

4,728,236

FASTENING DEVICE FOR USE ON THREADED BOLTS OR STUDS

BACKGROUND OF THE INVENTION

The subject invention is directed toward the art of fastening devices and, more particularly, to a plastic fastener of the type adapted for connection to threaded bolts or studs through the use of elastic catch projections distributed about the inner circumference of a bolt receiving opening.

It is already generally known in the art to let these catch projections extend obliquely in relation to the threaded bolt. Thus, after screwing in the threaded bolt, the end surfaces of the elastic catch projections lie against the under side of the bolt threads. The holding effect produced by the elastic projections is sometimes insufficient, especially in the case of vibrating stresses, such as occur, for example, in motor vehicles. Consequently, it is often necessary to provide an additional securing of the element.

SUMMARY OF THE INVENTION

According to the present invention a fastening device of the kind mentioned is provied which, with simple structure, produces an improved holding effect. That is, the holding forces are significantly increased.

According to the invention, the catch projections, in the zone of engagement with the threads of the bolt, are provided with serrations or graduated step-like forms. Through these step-like forms the catch projections are wedged with the threaded bolt, so that an increase of the holding force results.

In a further embodiment of the invention, the graduated step-like forms may be spaced an amount equal to the lead of the thread of the threaded bolt. Preferably, two graduated catch projections lie opposite each other. Each of these catch projections may have, for example, two graduated, step-like forms; but it is also possible to provide three or more graduated, step-like forms on each catch projection.

In accordance with a further aspect, the opening of the plastic part is provided with a conically-shaped entrance. The catch projections, in a further development of the invention, may lie against the conical entrance of the opening. In this way is given, besides a simple construction, a very good holding effect on the screwed-in threaded bolt and an equally good guiding function.

According to another aspect of the invention, several catch projections may be arranged one behind the other in the axial direction of the opening. Through this arrangement an additional increase of the holding force, especially with long threaded bolts, is obtained.

According to another feature of the invention, the opening may have guide ribs running lengthwise between the pairs of catch projections. Through use of these guide ribs an exact centering of the bolt is obtained.

Elastic plastic elements, provided with teeth, already belong to the state of the art. (Ger. Disclosure 3,011,121; Ger. Utility Model 6,934,480). These toothed elements, however, cooperated with other plastic parts, for example, the strap of a cable connection element, so that there is a fundamental difference between these teeth and the graduated, step-like forms according to the present invention. The step-like forms according to this invention cooperate with the threads of a threaded bolt, especially a coarsely threaded bolt, by which is produced a wedging with the individual threads.

According to another feature of the invention, there may be provided guide means located in the spaces between the catch projections and distributed over the circumference of the opening. Through these guide means, the threaded bolt receives, advantageously, partly or over its whole length, a perfect giving, so that, in all, a very good holding of the plastic part against the threaded bolt is assured.

In a further feature of the invention, the guide means may comprise rib-like projections adjoining the catch projections in the lengthswise axis of the opening of the plastic fastener. Preferably, the guide means are arranged above the catch projections relative to the entrance end of the opening.

The guide means may be given a conical configuration so that, in this way, a good spring effect and a good fitting to the outer circumference of the threaded bolt is assured.

According to another feature of the invention, the height of the guide means or rib-like projections may be less than or equal to the height of the catch projections if the catch projections and the guide mean adjoin each other lengthwise of the opening of the plastic part. In this way, a good distribution of the holding and guiding of a threaded bolt within the opening is assured.

According to another feature of the invention, the guide means may also extend over the whole length of the opening. It is also possible for the guide means and the catch projections to be distributed evenly about the circumference of the opening.

BRIEF DESCRIPTION OF THE DRAWINGS

The above and other objects and advantages of the invention will become apparent from the following descriptions when read in conjunction with the accompanying drawings wherein:

FIG. 2 shows the construction according to FIG. 1, with a threaded bolt partly screwed or driven in;

DESCRIPTION OF THE PREFERRED EMBODIMENTS

Figure 1:
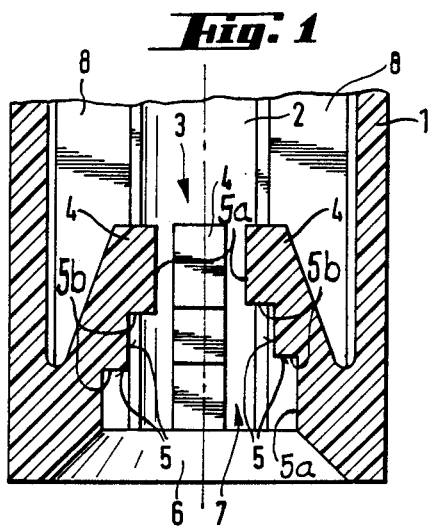
FIG. 1 is a partial longitudinal cross-sectional view of a preferred embodiment of the invention, the view is taken along the line I—I in FIG. 3.

Referring more particularly to the drawings wherein the showings are for the purpose of illustrating preferred embodiments of the invention only, and not for the purpose of limiting same, FIG. 1 is a longitudinal cross-sectional view through a molded plastic fastener or part 1 which has an opening 2 provided with improved holding means 3. As will become apparent, the fastener or part 1 can be a separate, independent fastening element or incorporated as an integral component of a larger part or assembly.

Figure 2:
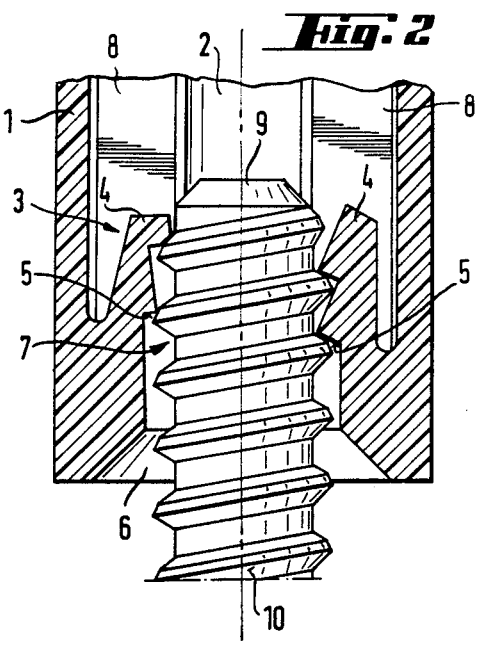

As shown in FIGS. 1 and 2, the holding means 3 comprises a plurality of resilient catch projections 4 which are preferably distributed relatively uniformly about the inner circumference of the opening 2. As can be appreciated, the opening 2 preferably has a diameter relatively larger than the bolt or stud 9 to which the part 1 is to be connected. The resilient catch projections 4 are integrally joined to the wall of opening 2 and extend radially inward to a diameter significantly less than the diameter of the bolt 9. Also, it should be noted that the projections 4 are inclined inwardly from the entrance end 6 of opening 2.

According to an aspect of the invention, the inner faces or edges of the projections 4 are provided with serrations or step-like graduated forms 5. As shown in FIG. 1, the forms 5 on each projection are spaced from those on the same projection and are axially offset from those in the adjacent projections by an amount corresponding to the rise or lead of the helical thread on the associated bolt 9. Thus, when the bolt 9 is received in the opening 2, the apices of the forms 5 on each projection 4 enter between threads 10.

The shape of the step-like, graduated forms 5 shown in FIG. 1 is preferred. Note that when in the undeflected position, the forms 5 are defined by faces 5a and 5b which are, respectively, parallel and perpendicular to the longitudinal axis "a" of the opening 2. This arrangement simplifies construction of the molds used for forming the components and offers advantages relative to the holding forces generated.

As can be seen from FIG. 2, through these specially shaped graduated forms 5 of the elastic catch projections 4, the latter are, in effect, wedged with the threaded bolt 9, so that an increased extraction force is reached. On the other hand, a rapid and simple mounting is given, since in screwing in or pushing on, the graduated forms 5 of the elastic catch projections 4 pose no appreciable resistance to the threads 10 of the coarsely threaded bolt.

Figure 3:
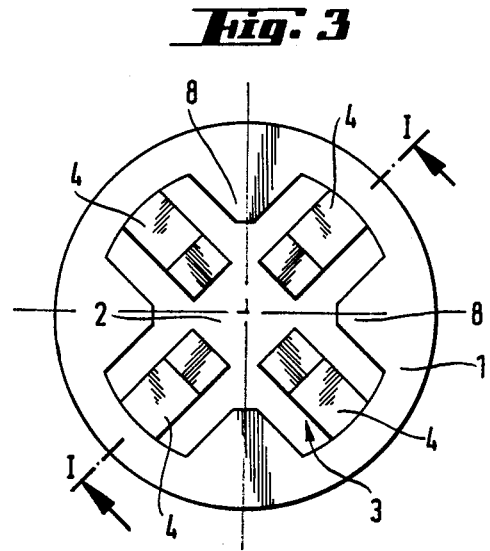
FIG. 3 is a top view of the device of FIG. 1.

Preferably, as can be seen from FIGS. 1 and 3, two pairs of catch projections 4 are arranged diametrically opposite each other, in each case. Between these pairs of catch projections 4 are provided guide ribs 8, which extend the length of opening 2 and serve for the centering of the threaded bolt 9. As can be appreciated, the open diameter between the ribs 8 is desirably equal to or only slightly larger than the diameter of the associated bolt 9.

Figure 4:
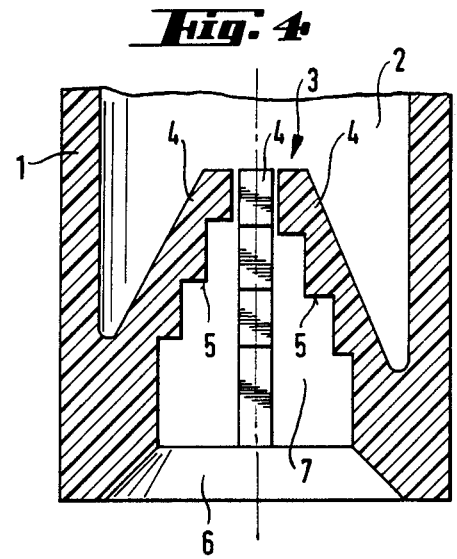
FIG. 4 is a partial cross-sectional view of another embodiment of the present invention.

According to the embodiment of FIG. 4, it is possible to provide, instead of two graduated forms 5 on each projection 4, three such forms, by which a further wedging of the elastic catch projections with the threading 10 of a coarsely threaded bolt 9 is effected.

The catch projections 4 are preferably arranged adjacent the zone of the conical entrance 6 of the opening 2. That is, they are relatively close to this conical entrance. With this, on screwing in or pounding in a threaded bolt, the graduated forms 5 of the elastic catch projections at once go into action and lead to a very good holding of the plastic part 1 against the coarsely threaded bolt 9. The surface of the bolt may also be coated with a plastic, such as PVC, or painted, for example.

Figure 5:
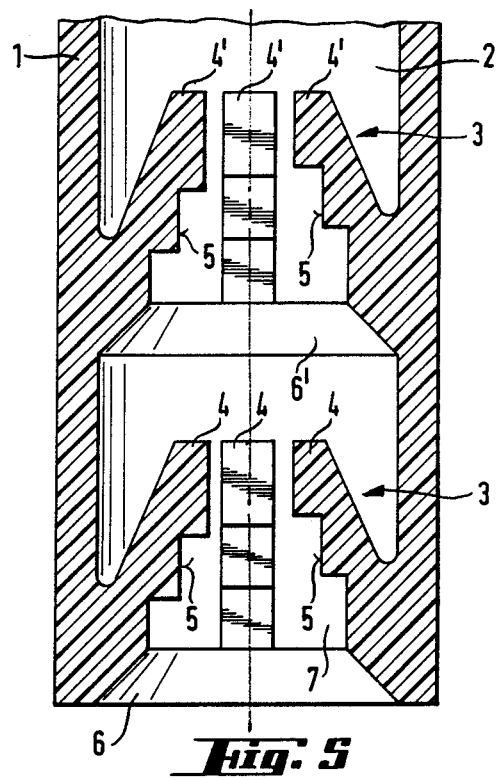
FIG. 5 shows a partial cross-sectional view of another modified form of the present invention, with pairs of catch projections arranged in succession.
Figure 7:
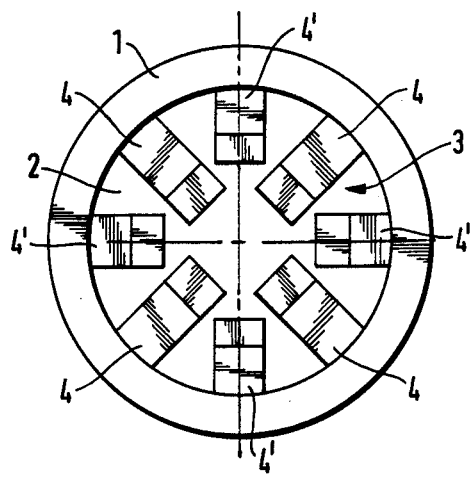
FIG. 7 is a top view of the embodiment of FIG. 5.

In the embodiment according to FIG. 5, the plastic part 1 has several pairs of catch projections 4 and 4', provided with the graduated forms 5, which are arranged in sets axially spaced one behind the other in the lengthwise direction of the opening. Between the sets of catch projections, 4 and 4', can be positioned conical entrance 6', which is similar to the conical entrance 6. This form of execution is especially suitable for the holding of long, coarsely threaded bolts 9, and leads to a considerable increase in the holding force. From FIG. 7 can be seen that with this form of construction, a total of eight catch projections are used, which lie opposite each other and thus form the previously mentioned pairs of catch projections. Through this construction, the guide ribs 8, shown in FIG. 3, can be omitted, since through the large number of elastic catch projections 4, provided with graduated forms 5, the screwed in or pounded in bolt is given sufficient guiding. In this case, for example, the lower pairs of catch projections 4 may be circumferentially displaced by 45 degrees from the upper pairs of catch projections 4' (see FIG. 7).

Figure 6:
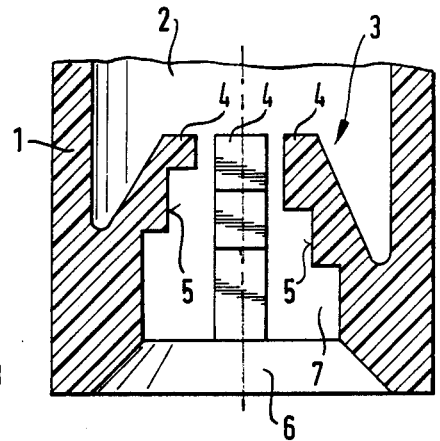
FIG. 6 shows in longitudinal cross-section another possible embodiment of invention.

In the embodiment according to FIG. 6, the catch projections 4 lying opposite each other have two graduated forms 5 on each. These graduated forms 5 are likewise arranged in the zone of engagement 7 of the coarsely threaded bolt. But here the axial offset between the forms 5 on adjacent projections 4 are longer than in the construction according to FIG. 1; that is, this construction can be used for coarsely threaded bolts with a very large lead.

Figure 8:
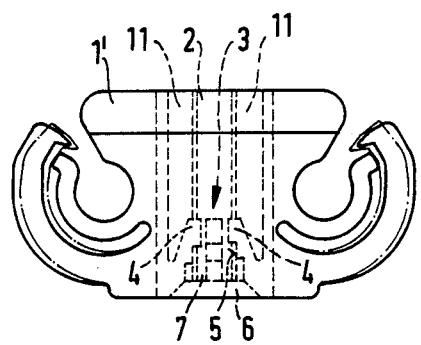
FIG. 8 shows a fastening device according to the invention, used in a pipe or tube holding component.

FIG. 8 shows the invention incorporated in a pipe holding device 1'. This pipe holding device 1' has a central opening 2 passing through it, in which is arranged the holding means 3 according to the invention, with the catch projections 4 lying opposite each other. These catch projections 4 are provided, as described before, with graduated forms 5 and positioned closely adjacent the conical entrance 6 of the opening 2. With this is given a displacement to the side of the catch projections 4 in relation to the guide ribs 11. Here, the arrangement may be such that the guide ribs extend over the whole length of the opening 2.

Figure 9:
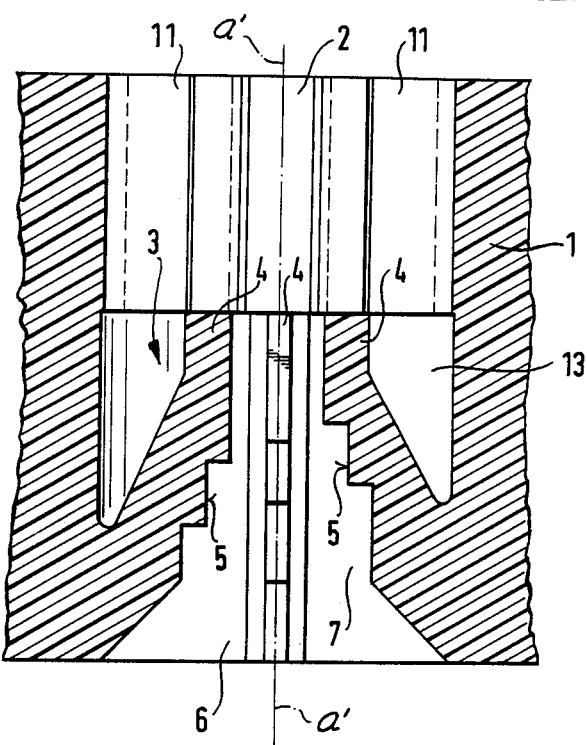
FIG. 9 shows a longitudinal cross-section through another embodiment with guide ribs and catch projections; and, FIG. 10 is a top view of the embodiment of FIG. 9.
Figure 10:
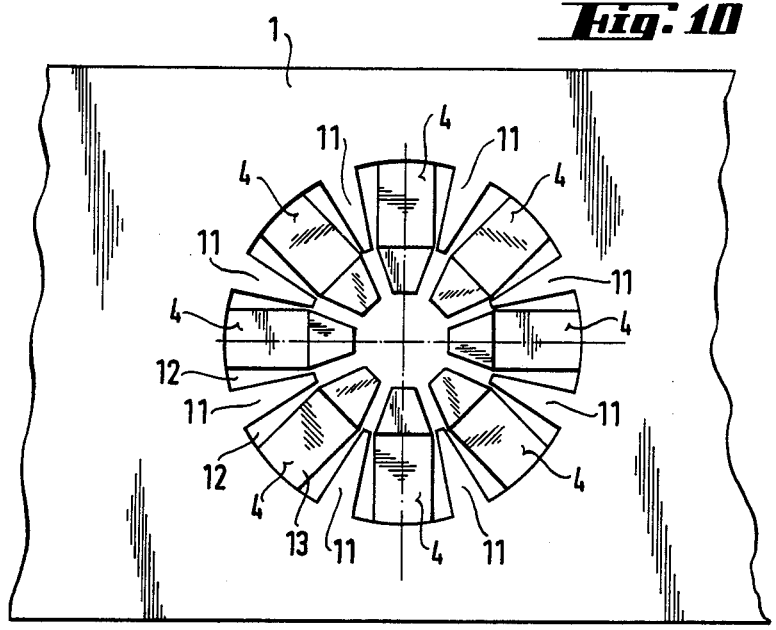

In the modification according to FIGS. 9 and 10, there adjoin the catch projections 4 at the lengthwise axis a' of the opening 2 of the plastic part 1, the guide ribs 11, which, in this example, are located above the catch projections 4.

From FIG. 9 it can also be seen that behind the elastic catch projections 4, a wedge-form interspace 13 is provided so that the catch projections 4 can spring backward in installation.

From FIG. 10 it can be seen that the guide ribs 11 are preferably designed to have a conical configuration in transverse cross-section.

The height of the guide ribs 11 may be less than or equal to the height of the catch projections 4 according to FIG. 1. From FIG. 9, it can also be seen that the graduated forms 5 of the catch projections 4 are supported before the entrance 6. Now, if a threaded bolt, after passing through the entrance 6, is screwed in or pounded in, then, in installation, the graduated forms 5 of the catch projections 4 are wedged, while the threaded bolt, through contact against the front zone of the guide ribs 11, is given a very good guiding over the whole height of the plastic part 1. It is also possible, advantageously, to provide, for example, according to FIG. 10, eight catch projections 4, above which lie, displaced to the side, eight guide ribs 11.

Through the guide ribs 11, in cooperation with the catch projections 4, a very good guiding of the threaded bolt, screwed into the plastic part 1, is obtained.

All forms of execution have in common that elastic catch projections 4 or 4' are used, of which the flexibility assures a facilitation of mounting. In the zone of engagement 7 of the elastic catch projections 4, two or more graduated forms 5 are provided, which are preferably offset to correspond to the lead of threading of bolt 9. These graduated forms, in cooperation with the springy design of the catch projections 4, serve for wedging against the threads 10 of the bolt 9. In the form of execution according to FIGS. 1, 2, and 3, four catch projections are arranged opposite each other while guide ribs 8 run between these catch projections 4 in each case. The guide ribs 8 may extend through the whole plastic part 1 and effect a guiding and centering of the screwed-in bolt.

The invention may be used wherever plastic parts are to be held through threaded bolts, especially coarsely threaded bolts. For example, FIG. 8 shows the invention in association with a holder for brake or fuel lines. The invention can also, for example, be used for fastening insulating mats, fastening carpet, etc. Moreover, through the special design of the holding device according to the invention, it is very suitable for automatic or robotic feeding. That is, installation on the threaded bolts can take place automatically, for example.

The invention has been described with reference to the preferred embodiments. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. A fastening device for connection to an associated threaded bolt comprising:
    a molded plastic body having an inwardly extending opening with an entrance end sized to receive the associated bolt;
    at least one resilient elastic catch projection member mounted on said opening adjacent said entrance end and extending radially and axially inward relative to said entrance end, said at least one catch projection member terminating in a free end lying at a diameter significantly less than the diameter of the associated bolt; a series of graduated forms formed on a radially inward facing surface of said catch projection member and adapted to engage between adjacent threads of the associated bolt as said bolt is moved axially into said opening and said catch projection is deflected radially outward; said graduated forms comprising step-like protuberances formed such that when said elastic catch projection member is in its undeflected position each successive protuberance inwardly of said entrance end lies progressively closer to the axis of said opening and is defined by a pair of intersecting faces which respectively lie in planes generally perpendicular and parallel to the axis of said opening; and,
    at least one guide rib formed in said opening to extend parallel to said at least one catch projection member.

2. A fastening device according to claim 1 wherein said protuberances have apices defined by said intersecting faces with said apices spaced apart a distance substantially equal to the lead of the associated bolt.

3. A fastening device according to claim 1 including at least two of said catch projection members lying on opposite sides of said opening.

4. A fastening device according to claim 1 including at least a second catch projection member positioned axially inwardly of said at least one catch projection member.

5. A fastening device according to claim 1 including a plurality of said catch projection members spaced circumferentially about the interior of said opening with guide ribs positioned intermediate adjacent catch projection members and extending generally parallel thereto.

6. A fastening device according to claim 5 wherein said guide ribs have a radial height no greater than the height of the catch projection members.

7. A fastening device according to claim 1 wherein said at least one guide rib has a portion extending axially into said opening beyond said catch projection member.

* * * * *